April 20, 1965 F. M. CHAPMAN ET AL 3,179,104
FOLDING BARBECUE STOVES
Filed Aug. 19, 1963 3 Sheets-Sheet 2

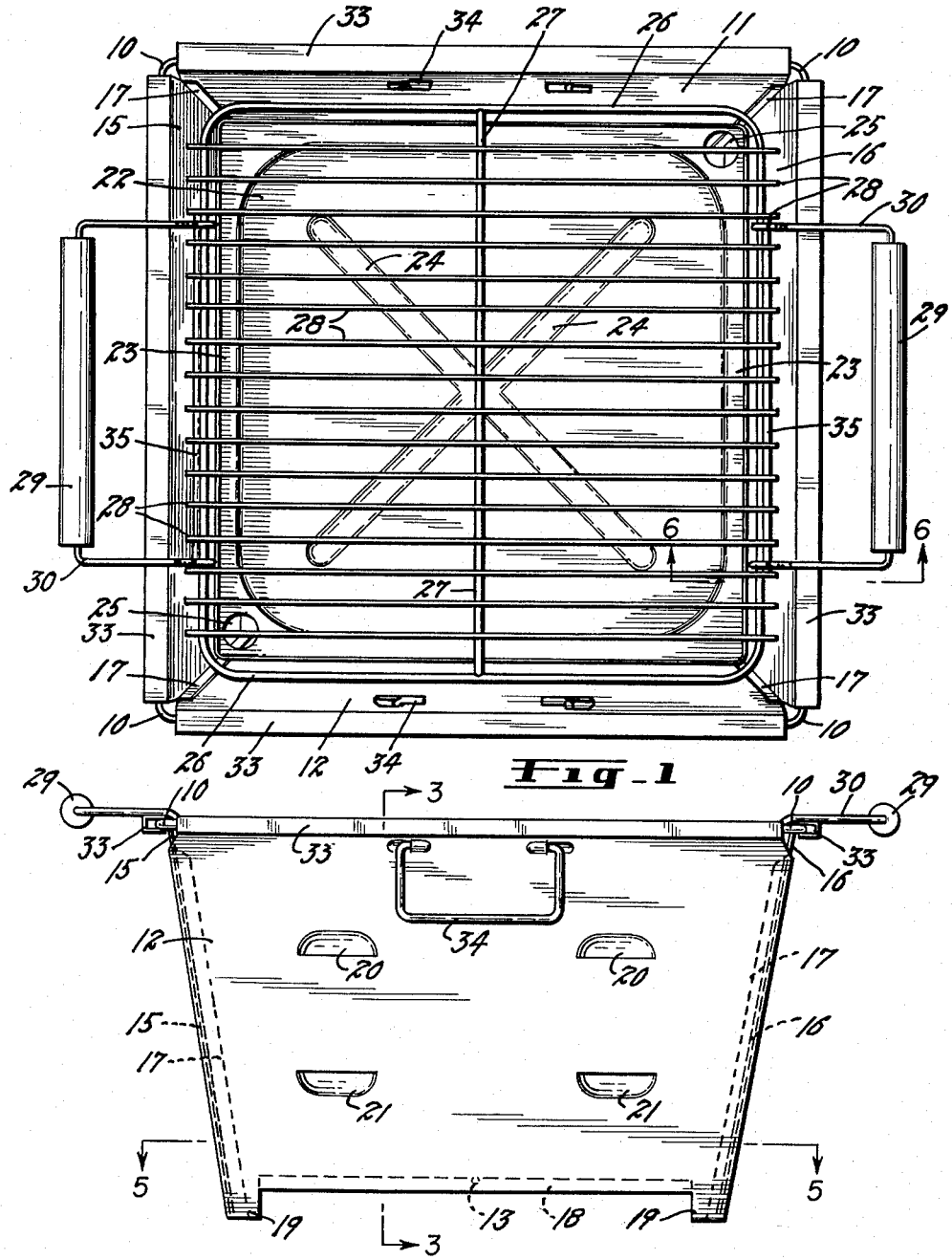

INVENTORS.
FRED M. CHAPMAN
LOUIS J. SWEENEY
BY
ATTORNEY

April 20, 1965   F. M. CHAPMAN ETAL   3,179,104
FOLDING BARBECUE STOVES
Filed Aug. 19, 1963   3 Sheets-Sheet 3

INVENTORS.
FRED M. CHAPMAN
LOUIS J. SWEENEY
BY
ATTORNEY

United States Patent Office 3,179,104
Patented Apr. 20, 1965

3,179,104
FOLDING BARBECUE STOVES
Fred M. Chapman and Louis J. Sweeney, Denver, Colo., assignors to Pioneer Products, Inc., Denver, Colo., a corporation of Colorado
Filed Aug. 19, 1963, Ser. No. 303,016
1 Claim. (Cl. 126—9)

This invention relates to a charcoal stove of the type used for camping or for outdoor barbecuing, such as a hibachi, and has for its principal object the provision of a sturdy, highly efficient barbecue stove and grill which can be readily folded into a flat unitary package for easy portability or storage in the trunk of an automobile and which can be instantly unfolded and erected when desired for use without requiring the use of tools of any kind.

Another object is to provide a portable collapsible barbecue stove which will provide efficient and uniform combustion of the fuel; which may be supported upon any desired supporting surface when in use without damage to the surface; and which will provide a convenient, tray-like, cooking grill which may be used for carrying food to and from the stove as well as for supporting the food during the cooking thereof.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawing and throughout the description.

In the drawings:

FIG. 1 is a top plan view of the improved barbecue stove assembled and erected for use;

FIG. 2 is a side elevational view thereof;

Figure 3:
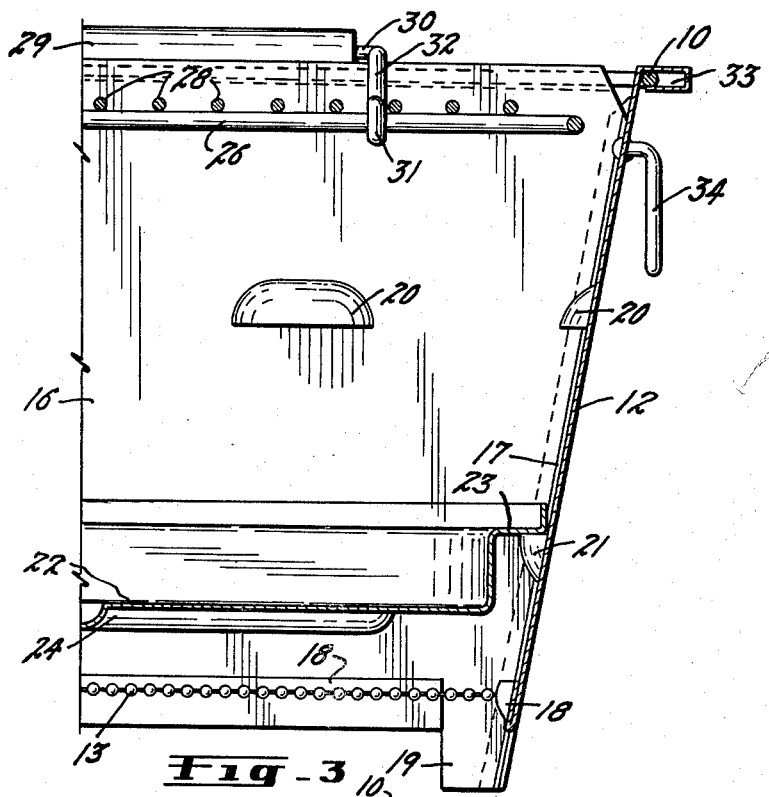
FIG. 3 is an enlarged, fragmentary, vertical section taken on the line 3—3, FIG. 2.

The improved barbecue stove is preferably square in plan and employs four side plates each of greater width at the top than at the bottom and each hingedly mounted along its upper edge along one side of a flat, square, rod or wire frame 10. Two of the opposite side plates, which will be herein designated as the supporting plates 11 and 12, are connected together at their bottoms by a length of flexible chain 13, of less length than the length of the sides of the top rod frame 10, which limits the degree of separation of the bottoms of the plates 11 and 12 to cause them, when erected, to incline inwardly toward each other as the bottoms are approached.

The side edges of the supporting plates 11 and 12 are flanged inwardly as indicated at 14 and these flanged side edges are inclined inwardly as the bottoms are approached corresponding in degree to the inclines of the supporting plates as set by the chain 13.

The two remaining side plates, which will be herein designated as the spreading plates 15 and 16, have flanged side edges 17 inclined to correspond to the inclines of the side edges of the supporting plates 11 and 12.

The mid-portions of the bottoms of all of the plates are cut back at the bottom and turned upwardly as indicated at 18 to leave corner supporting legs 19, which when the sides are assembled, have an L-shaped cross-section. Each side plate is cut and stamped to form two upper, inwardly-extending, open-bottomed, horizontally-aligned, indentations 20 and two lower-open-topped, inwardly-extending, horizontally-aligned indentations 21. Each of the supporting plates is provided with a downwardly-foldable, outwardly-extending carrying handle 34.

Figure 5:
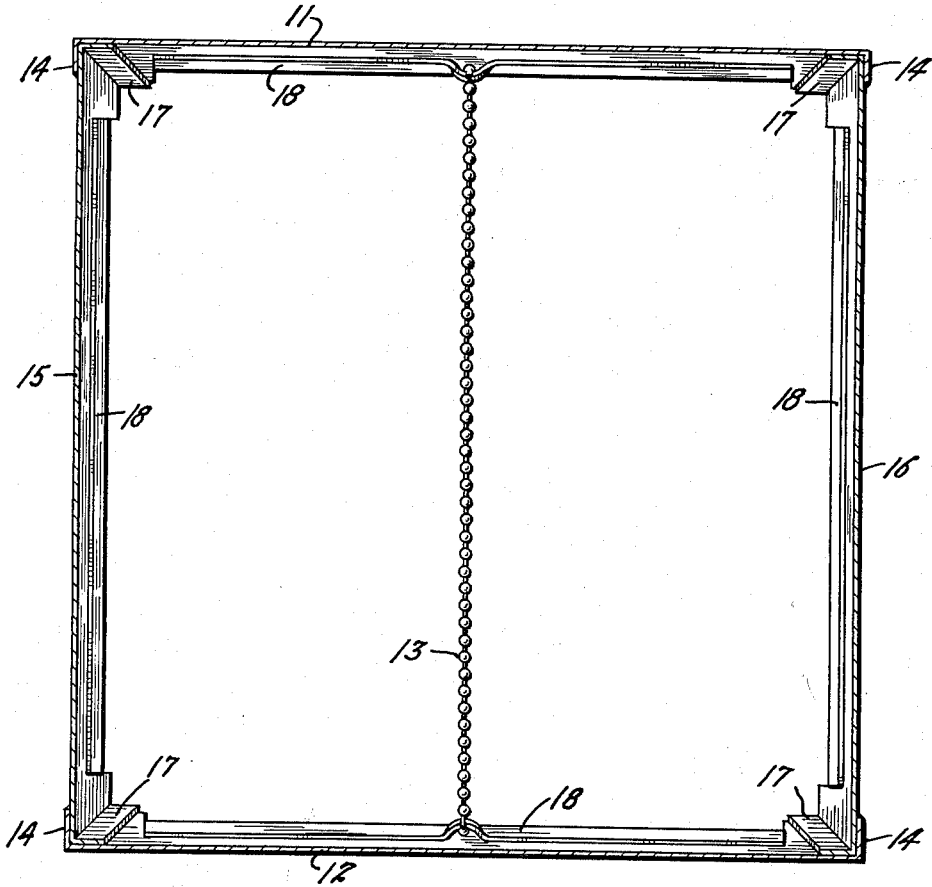
FIG. 5 is an enlarged horizontal section looking downwardly on the line 5—5, FIG. 2.

The four sides are erected by swinging the two supporting plates 11 and 12 downwardly until stopped by the chain 13. The two spreading plates 15 and 16 are now swung downwardly until their flanged side edges 17 rest in the angles of the flanges 14 of the supporting plates 11 and 12, as shown in FIG. 5. As the spreading plates swing downwardly, they force the supporting plates uniformly apart to tighten the chain 13 and provide a rigid self-sustaining, four-sided enclosure.

After erection, a rectangular fire tray 22 is dropped horizontally into the enclosure. The fire tray is provided with a peripheral flange 23 which rests upon the four lower indentations 21 to suspend the tray therefrom. The rectangular shape of the fire tray still further assists in shaping and maintaining the rigid rectangular configuration of the stove. The fire tray is provided with suitable drainage indentations 24 and with two diagonally opposed finger openings 25. The tray is designed to receive the charcoal fuel of the stove. The upper indentations 20 supply additional secondary air for combustion and the finger openings 25 provide means for gripping and lifting the fire tray.

Figure 6:
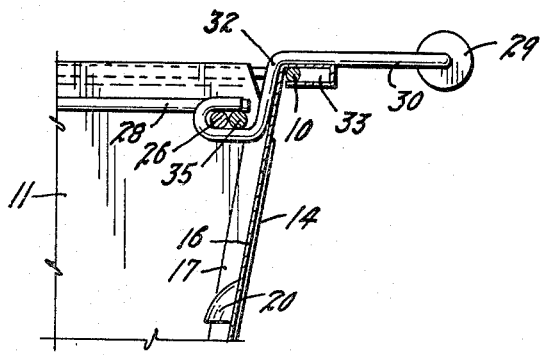
FIG. 6 is an enlarged fragmentary detail section taken on the line 6—6, FIG. 1.

The improved stove is provided with a removable barbecue grill consisting of a rectangular rod frame 26 having a medial frame rod 27 across which a plurality of parallel grill rods 28 are welded. The grill is provided with two oppositely-positioned hand grips 29. Each hand grip is mounted on a U-shaped handle member 30, the extremities of which are pivotally mounted on the grill frame 26 by a U-shaped bend 31. A stop rod 35 extends between and closes the two U-shaped bends 31. When the handle members are swung outwardly and upwardly, the stop rods contact below the extremities of the grill rods 28, as shown in FIG. 6, to stop the handles in a horizontal position so that they may rest upon, and support, the grill on the stove as illustrated. When not in use, the handle members may be folded inwardly beneath and against the grill for storage. The handle members 30 are provided with substantially 90° bends 32 which fit into the stove enclosure and support the grill below the top of the stove to prevent lateral movement of the grill.

Figure 4:
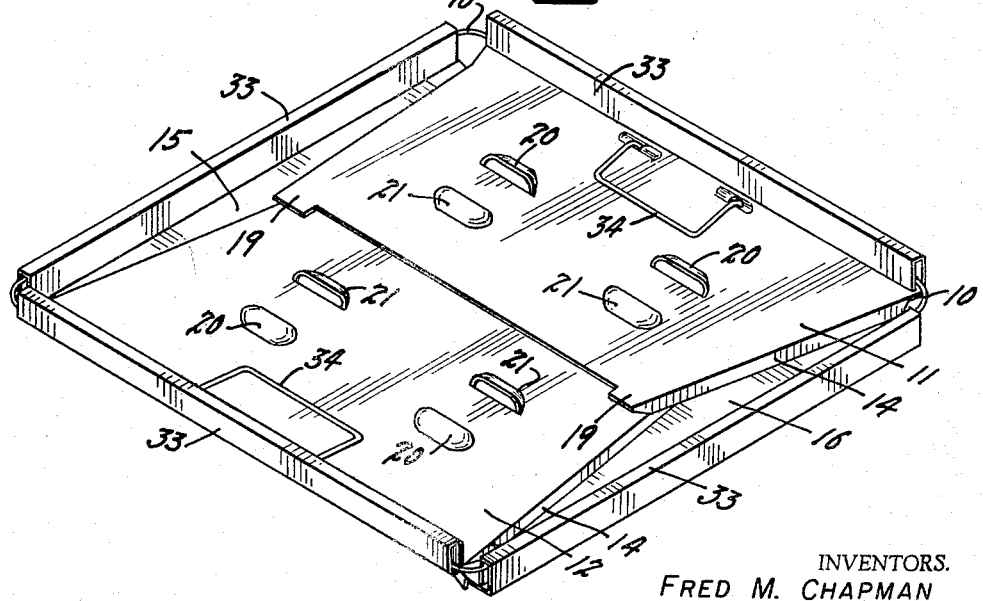
FIG. 4 is an orthographic view of the stove folded for carrying or storage.

It is desired to call particular attention to the manner of hingedly mounting the side plates on the wire frame 10. This is accomplished by forming an outwardly, downwardly and inwardly extending roll in each plate surrounding one of the sides of the wire frame. This particular roll forms an elongated hollow box flange 33 along the upper edge of each side plate. When in the erected position, the flanges 33 have a greater horizontal than vertical width in cross section and the wire frame sides occupy a position therein adjacent the side plates as shown in FIG. 6. When the device is folded flat, as shown in FIG. 4, the hollow, box flanges allow the various plates to move into parallel relation so that a flat package is obtained.

While a specific form of the invention has been described and illustrated herein, it is to be understood that the same may be varied, within the scope of the appended claim, without departing from the spirit of the invention.

Having thus described the invention, what is claimed and desired to be secured by Letters Patent is:

A foldable barbecue stove comprising: a rectangular rod frame; two supporting side plates hinged along their upper edges along two opposite sides of said frame; two spreading side plates similarly hinged along their upper edges to the remaining two sides of said frame and adapted to swing downwardly and outwardly between said supporting side plates to spread the latter apart; limiting means connected to and between the lower extremities of said supporting side plates to limit the degree of spread of the latter; inwardly extending flanges formed on the side edges of said supporting plates to receive said spreading plates; a removable fire-supporting tray of less area than the top and of greater area than the bottom of said enclosure enclosed and supported by said side plates and maintaining the latter in rectangular relation; and an open grill positioned in said enclosure and handle means on said grill supporting the latter in and below the top of said enclosure, the hinged structure of said plates to said frame comprising outwardly, downwardly and inwardly turned upper edges on said plates surrounding and forming a hollow box flange around the sides of said rod frame, said box flanges having a greater width than the rods they enclose so that the upper edges of said sides are transversely movable on the sides of said rod frame.

References Cited by the Examiner

UNITED STATES PATENTS

| | | | |
|---|---|---|---|
| 1,115,388 | 10/14 | Brown | 220—7 |
| 1,314,862 | 9/19 | Eyler | 220—7 |
| 2,556,365 | 6/51 | McKnight | 126—9 |
| 2,714,465 | 8/55 | Blair | 220—6 |
| 2,780,215 | 2/57 | Vacanti | 126—9 |

JAMES W. WESTHAVER, *Primary Examiner.*